United States Patent [19]
Wagner et al.

[11] Patent Number: 5,499,954
[45] Date of Patent: Mar. 19, 1996

[54] CONTROL METHOD AND ARRANGEMENT FOR A REGULATING VARIABLE DETERMINING A MOTOR VEHICLE CLUTCH ROTATIONAL SPEED DIFFERENCE

[75] Inventors: Gerhard Wagner, Remseck; Lothar Hein, Fellbach, both of Germany

[73] Assignee: Mercedes-Benz AG, Germany

[21] Appl. No.: 332,517

[22] Filed: Oct. 31, 1994

[30] Foreign Application Priority Data

Oct. 29, 1993 [DE] Germany .................. 43 37 021.7

[51] Int. Cl.⁶ .................. B60K 23/02; B60K 41/22
[52] U.S. Cl. .................. 477/174; 477/180
[58] Field of Search .................. 477/174, 180

[56] References Cited

U.S. PATENT DOCUMENTS

| | | | |
|---|---|---|---|
| 4,072,220 | 2/1978 | Hamada | 477/174 |
| 4,081,065 | 3/1978 | Smyth et al. | 477/176 |
| 4,722,426 | 2/1988 | Bellanger | 477/175 |
| 5,023,789 | 6/1991 | Lampe et al. | 364/424.1 |
| 5,083,273 | 1/1992 | Nishiwaki et al. | 364/424.1 |
| 5,189,611 | 2/1993 | Petzold et al. | 364/424.1 |
| 5,307,269 | 4/1994 | Kohmo | 364/424.1 |
| 5,337,866 | 8/1994 | Sturmer et al. | 477/175 |

FOREIGN PATENT DOCUMENTS

| | | |
|---|---|---|
| 0426745B1 | 2/1990 | European Pat. Off. . |
| 3640139C2 | 6/1991 | Germany . |
| 3636952C2 | 10/1991 | Germany . |
| 4100091A1 | 7/1992 | Germany . |
| 88/00795 | 4/1989 | WIPO . |

*Primary Examiner*—Dirk Wright
*Attorney, Agent, or Firm*—Evenson, McKeown, Edwards & Lenahan

[57] ABSTRACT

A method and arrangement controls a regulating variable which determines the rotational speed difference of a clutch by selecting a phase with a curve of the regulating variable specified by a time function during a transient clutch condition. The beginning and the end of this phase are fixed by one or two influencing variables which are specific to the vehicle. One of the influencing variables is determined by the accelerator pedal actuation and another variable is determined by the clutch temperature.

16 Claims, 4 Drawing Sheets

5,499,954

CONTROL METHOD AND ARRANGEMENT FOR A REGULATING VARIABLE DETERMINING A MOTOR VEHICLE CLUTCH ROTATIONAL SPEED DIFFERENCE

BACKGROUND AND SUMMARY OF THE INVENTION

The present invention relates to a method and arrangement for controlling a regulating variable which determines the rotational speed difference of a motor vehicle clutch. More particularly, the control method of the present invention is directed to controlling a regulating variable which determines a rotational speed difference of a clutch located in a force path between an internal combustion engine and a change-speed gearbox of a motor vehicle. The arrangement includes an electronic control unit configured and arranged to process input signals dependent on influencing variables specific to the motor vehicle and fixed required value characteristics and to provide output signals representative of required values for actuating an element adjusting the regulating variable. The arrangement further includes a device configured to record an influencing variable dependent on a speed of an accelerator pedal and operatively associated with the electronic unit, and a device configured to record an influencing variable dependent on a clutch temperature and operatively associated with the electronic unit. During a transient clutch condition, a phase with a variation, as determined by a specified time function, of the regulating variable is selectable, and a beginning and an end of both the transient clutch condition and the phase are respectively fixed as a function of the influencing variables specific to the vehicle.

In a known control method of the type described in EP 0 426 745 B1 for controlling a clutch which is arranged between a driving engine and a motor vehicle change-speed gearbox and which is configured as a lock-up clutch of a hydrodynamic unit or as a separating clutch, devices are provided for determining the engine rotational speed and the gearbox output rotational speed. A slip control switching device is also provided to determine the pressure for an actuating drive of the clutch or lock-up clutch. In this known arrangement, the control deviation is determined by comparing specified required slip values and the actual slip values determined from the rotational speeds, and this control deviation is converted into pressures in accordance with a specified control algorithm.

In gearbox controls, particularly on passenger car automatic gearboxes, the gearbox input rotational speed which coincides with the clutch output rotational speed is not usually known directly because no suitable sensors are arranged on the driven shaft of the clutch or, in the case of automatic gearboxes, on the turbine shaft of the hydrodynamic torque converter. In the known method, therefore, efforts are made to achieve good gear-changing quality without sacrifice of comfort and without the engine speeding up during gear changes of the change-speed gearbox even though the clutch output rotational speed is unknown. For this purpose, provision is made in the known method for the clutch output rotational speed, which is necessary for determining the slip, to be determined from a gear transmission ratio of the change-speed gearbox and the gearbox output rotational speed.

During a gear-changing procedure without a fixed gear transmission ratio in the known arrangement, activation of the clutch actuating drive then takes place with a dead time period during which the pressure is reduced until a predetermined slip is produced. During the adjoining second time interval which lasts until the instant when the new gear is selected, the pressure for the clutch actuating drive is kept constant or is varied while being controlled as a function of time. In this known method, therefore, the transient clutch condition is fixed by the beginning of the gear change and by the end of the gear change in the change-speed gearbox. The phase with the variation, determined by a time function, of the clutch actuating drive pressure is only optionally provided and, with respect to the beginning of the phase, is fixed by a predetermined slip value of the clutch and, with respect to the end of the phase, is fixed by the end of the gear change in the change-speed gearbox.

A different method for controlling a clutch in a hydraulic torque converter of a vehicle gearbox is described in DE 3640139 C2. This gearbox is connected to an engine with a throttle butterfly. The clutch is used under certain conditions for mechanically connecting the input and output ends of the hydraulic torque converter and is actuated, in specified vehicle speed range, by such a relatively small engagement force that clutch slip is possible. In this known method, a device for recording an influencing variable depending on the speed of the accelerator pedal is not used.

It is not possible with this second-mentioned known method to select a phase with a curve of the regulating variable determined by a specified time function in that known method is based on a different technical objectives. That is, due to clutch slip, known clutch systems do not achieve an adequate braking effect by the engine when the accelerator pedal is released for retardation purposes while the vehicle is being driven in a specified speed range in which the clutch is normally actuated in the slipping condition. Although effecting a control in the sense of a direct connection of the input and the output of the torque converter ensures the desired braking effect by the clutch during retardation, other problems can be caused under certain operating conditions.

In order to prevent such problems from occurring, the known method determines when the throttle butterfly has an amount of opening below a specified reference value and when the vehicle speed falls within the specified range. The engagement force of the clutch is then increased above the value which is normally present at the specified reference amount of opening of the throttle butterfly. Because in this known method the throttle butterfly opening falls below the specified value, the engagement force of the clutch can be abruptly increased when the accelerator pedal is released for retardation purposes in order to reduce or prevent slip so that a braking effect is caused by the engine in the desired manner.

An arrangement of a different type for controlling a clutch is described in PCT/WO 89/03318 A1, in which the clutch is located in the force path between a driving engine and a change-speed gearbox of a motor vehicle. The transmission capability of the clutch is automatically controlled as a function of the degree of opening or angle of the throttle butterfly, or as a function of the position of the accelerator pedal substantially such that the transmission capability is matched to the current torque requirement. A high transmission capability is therefore associated with a high torque requirement and a correspondingly lower transmission capability is associated with a lower torque requirement.

This known arrangement attempts to avoid torque shocks and oscillations in the drive train after the clutch in the case of a sudden increase in the torque requirement under tip-in conditions, i.e. during a change from instantaneous overrun operation in which the driving engine is driven by the vehicle (and of course the degree of opening of the throttle butterfly and therefore the transmission capability of the clutch are low) into driving operation in which the driving engine drives the vehicle. For this purpose, the transmission capability is increased in the known arrangement in this situation, i.e. in the case of a small throttle butterfly opening, only to the extent that the clutch operates with slip during a short interval of time. It is only when the throttle butterfly opening is very small and the speed of the throttle butterfly or of the accelerator pedal is very high that a phase with a falling curve, determined by a specified time function, of the transmission capability is initiated by the control. This phase, however, is located in time before the desired transient clutch condition characterized by slip. In this known arrangement, the curve of the transmission capability in the phase is always the same both with respect to the angle of inclination and with respect to the time duration even in the case of different throttle butterfly openings and even in the case of different speeds of the throttle butterfly or of the accelerator pedal.

A clutch control device for a motor vehicle shown in DE 3636952 C2 operates with an accelerator pedal pick-up and with a characteristic converter device activated by the accelerator pedal pick-up. This known clutch control device, in contrast to the other known arrangement for controlling a regulating variable determining the rotational speed difference of the clutch, does not employ a device for recording an influencing variable depending on the temperature of the clutch. Consequently, it is not possible to select a phase with a curve, determined by a specified time function, of the regulating variable. It is intended to offer the possibility of controlling the clutch engagement procedure as a function of the driving condition or non-driving condition of the vehicle and as a function of the accelerator pedal position. For this purpose, this type of known clutch control appliance is characterized by the accelerator pedal pick-up having a first pick-up for generating a first signal giving the accelerator pedal position and a second pick-up for generating a second signal giving the actuation speed of the accelerator pedal. The characteristic converter device has a first output device which responds to the first signal by generating a first actuation signal in order to carry out the complete engagement of the clutch device corresponding to the degree of actuation of the accelerator pedal, a second output device, which responds to the first and the second signal by generating a second actuation control signal in order to actuate the clutch device in a semi-engaged condition in relation to the degree of actuation of the accelerator pedal, and a third device which receives the first and the second actuation control signals in order optionally to supply either the first or the second actuation control signal, corresponding to the degree of actuation and the actuation speed of the accelerator pedal, to the clutch as a function of the presence of a plurality of specified conditions. On the basis of this configuration, the known clutch control device is intended to be capable of taking account of any given driving condition of the vehicle. That is, the clutch engagement procedure is intended to be carried out in an optimum manner depending on the current driving condition of the vehicle or on the vehicle being at rest and dependent on the accelerator pedal position of the vehicle.

Finally, DE 4100091 A1 shows an arrangement for monitoring a friction clutch, in particular an automated friction clutch of a motor vehicle, which includes a torque determination device for determining data which at least approximately represent the instantaneous torque occurring at the clutch, rotational speed sensors which supply data corresponding to the instantaneous rotational speed and the instantaneous output rotational speed, and a computing device which calculates data which depend on the data from the torque device and the rotational speed sensors, which follow one another at predetermined intervals and which represent the instantaneous friction power of the clutch at least approximately. The computing device adds the friction power data in order to determine a plurality of friction work averages over a plurality of time intervals of different durations compare the friction work averages determined in the individual time intervals with the specified limiting values allocated to the time intervals and, when the individual limiting values are exceeded, generates signals showing that the allocated limiting values have been exceeded. So that both an instantaneous peak load and the continuous load on the clutch can be monitored with a high level of accuracy, measures are taken in this arrangement such that a temperature sensor recording the temperatures of a component of the clutch is provided, and a plurality of limiting values, whose magnitude is a function of the clutch temperature, is respectively associated with the individual friction work averages. The computing device generates the signals showing that the limiting values have been exceeded as a function of the clutch temperature recorded and of the magnitudes of the limiting values specified for the clutch temperature recorded.

In order to reduce the energy consumption of motor vehicles with automatic gearboxes, clutches are used for locking up the hydrodynamic torque converter and, during certain gear changes in the automatic gearbox, these clutches must be disengaged. The lock-up clutches can be arranged in series with a mechanical torsional spring damper in the force path in order to keep torque oscillations caused by the internal combustion engine away from the downstream force transmission train. For this last mentioned purpose, it is also known to permit such clutches to operate with a certain slip, either as a supplement to or as a substitute for a torsional damper, in order to decouple the torque oscillations from the secondary side of the clutch.

An object of the present invention is to control the transient clutch conditions of such a clutch so that the transitions between steady-state and transient clutch condition satisfy high comfort demands (i.e. take place without being noticed by the driver) independent of whether the transient clutch conditions are initiated by gear changes, slip control processes or by other factors. These transient "opening" and "closing" clutch conditions occur in a clutch which only operates as a lock-up clutch for the torque converter during changes between the two steady-state clutch conditions of "clutch open" and "clutch closed". In the case of a clutch operating with a controlled slip, a third clutch condition, namely that with control to constant slip, is likewise considered as being "steady-state" so that the respective transient clutch conditions, appear during the change between, on the one hand, the third steady-state clutch condition and, on the other hand, one of the two other steady-state clutch conditions.

The present invention achieves the foregoing object by an arrangement and method in which a device configured to record an influencing variable dependent on rate of change of the clutch temperature, and at least one of the influencing variables, one of which depends on the rate of change of the clutch temperature and the other of which depends on the speed of the accelerator pedal, is utilized exclusively to fix the beginning and the end of the phase and to fix a curve, determined by a specified time function, of the regulating variable.

In the method and arrangement according to the present invention, various signals within an electronic gearbox control system influence the regulating variable variation, which is specified by a time function and specify this variation afresh in each computational cycle. The effects on the clutch of these changes in the regulating variable cannot then be noticed by the driver. That is, the transitions between the steady-state and transient clutch conditions take place at a high level of comfort.

In one embodiment of the method according to the present invention as applied to a friction clutch which can be engaged and disengaged by a clutch actuating element of the axial piston type, the working pressure, which here is to be regarded as the regulating variable, of the clutch actuating element is adjusted by a precontrolled pressure control valve whose pilot pressure is provided by a pilot valve electromagnetically controlled by an electronic control unit in the phase with a variation determined by a time function in accordance with the equation $$P(t) = mp \times t + po,$$

in which mp is the first time derivative of the pilot pressure p(t) (referred to below as the gradient), t is the time and po is the output pressure of the previous computational cycle. The change to the acceleration specification and the change to the temperature of the clutch are taken into account, as influencing variables specific to the vehicle, in the determination of the gradient mp.

If a vehicle acceleration is introduced by a change in the accelerator pedal adjustment, the condition of the clutch can be adapted previous to the change in engine torque. The gradient of the pressure variation is here calculated as a function of the rate of change of the acceleration requirement, i.e. throttle butterfly speed. Beyond a certain rate of change of accelerator pedal speed, the adaptation of the gradient additionally takes place beyond the actual actuation period. Corresponding to a recorded rate of change of the temperature of the friction surfaces of the clutch, the gradient can be influenced so that low rates of change reduce the gradient and higher rates of change increase the gradient. The temperature of the friction surfaces is determined, for example, empirically from a measured environment temperature, from a measured temperature of a working oil of a torque converter flowing around the clutch or from a different measured temperature which has a casual relationship with the temperature of the friction surfaces. In the case of a constant clutch temperature, however, no correction of the gradient takes place.

In the arrangement and method according to the present invention, therefore, the variation of the regulating variable specified by a time function (the characteristic phase of a transient clutch condition) can, for example, be specified as a function of the rates of change of different operating parameters and can be adapted afresh in each computational cycle. The algorithm thus established can be inserted as a sub-program within an overall clutch control algorithm which is employed for locking up a hydrodynamic torque converter and which operates by controlling a clutch slip to a predetermined required value.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
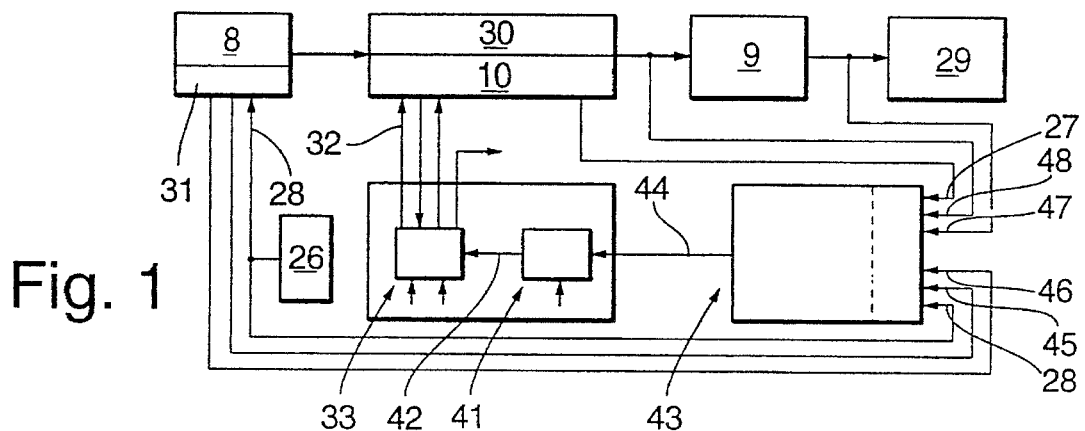
FIG. 1 is a block circuit diagram in which the method according to the present invention is used to control a clutch which is arranged as a lock-up clutch of a hydrodynamic torque converter in the drive train of a motor vehicle and which operates with a controlled slip.

Referring to FIG. 1, a hydrodynamic torque converter 30 and a change-speed gearbox 9 are arranged in the conventional sequence in a motor vehicle (not shown in any further detail) in a torque transmission or drive train leading from an internal combustion engine 8 to a final transmission or driving axles 29. The torque converter 30 can be locked up in known manner by a clutch 10 which operates with a controlled slip in order to decouple the downstream part of the drive train from torque oscillations. The change-speed gearbox 9 has, in a known manner which need not be shown in further detail, an automatic device for changing its gearbox transmission ratio in a stepped or stepless manner. An electronic control unit 31 is associated with the internal combustion engine 8 and controls the internal combustion engine as a function of, among other things, an input signal 28 which is output by an electronic device 26 and which depends on the position of the vehicle accelerator pedal.

A working pressure is supplied to the clutch actuating element of the clutch 10 via a working pressure conduit 32 which leads from a pressure control appliance 33. The pressure control appliance 33 adjusts the working pressure in the working pressure conduit 32 to the clutch actuating element as a function of the control pressure of a control pressure conduit 42 emerging from an electromagnetic pilot valve 41. The control part of the pilot valve 41 is connected by an electrical control line 44 to an output of an electronic control unit 43. The electronic control unit 43 processes input signals which depend on influencing variables which are specific to the vehicle, i.e, among other things, an input signal 27 which depends directly or indirectly on the temperature T of the clutch 10, the input signal 28 which depends on the condition of the accelerator pedal 26, an input signal 45 which depends on the rotational speed of the internal combustion engine 8, i.e. on the primary-side clutch rotational speed of the clutch 10, an input signal 46 which depends on the torque on the internal combustion engine 8, an input signal 47 which depends on the rotational speed of the output shaft of the change-speed gearbox 9, and an input signal 48 which depends on the rotational speed of the input shaft of the change-speed gearbox 9, i.e. on the secondary-side clutch rotational speed of the clutch 10.

Figure 3:
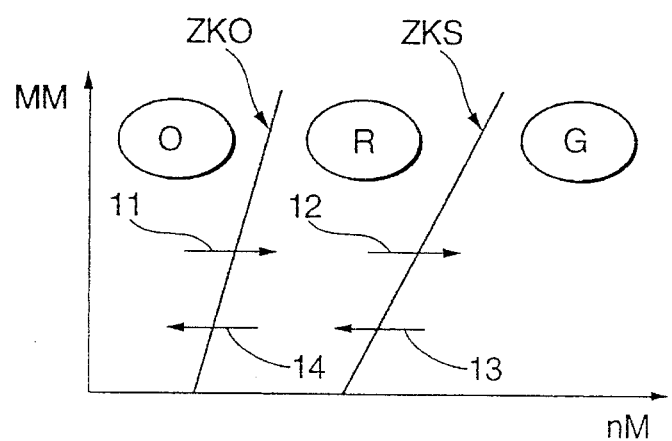
FIG. 3 is a characteristic diagram which depends on operating parameters of the internal combustion engine of the motor vehicle for changing the conditions of the clutch of FIG. 1.

The electronic control unit 43 controls the clutch 10 in accordance with the characteristic diagram of FIG. 3 and the characteristics of FIG. 4(c), 5(c) and 6(c). In FIG. 3, the rotational speed nM of the internal combustion engine 8 is plotted on the abscissa and the torque MM of the internal combustion engine 8 is plotted on the ordinate. This characteristic diagram is distinguished by two condition characteristics, ZKO and ZKS, which delimit a steady-state clutch condition R located in the medium rotational speed range in which the control unit 43 regulates a constant slip in the clutch 10 in accordance with one of the known slip control algorithms from a steady-state clutch condition O located in the lower rotational speed range in which the clutch 10 is completely open, (i.e. disengaged) and from a steady-state clutch condition G located in the upper rotational speed range in which the clutch 10 is completely closed (i.e. engaged).

When the engine operating point is displaced from the steady-state clutch condition 0 in the direction of higher rotational speeds, a transient clutch condition 11 or 12, in which the clutch 10 is actuated in the "closing" direction, is initiated when the condition characteristics ZKO and ZKS are respectively "driven over". If the engine operating point is displaced from the steady-state clutch condition G in the direction of lower rotational speeds, a transient clutch condition 13 or 14, in which the clutch 10 is actuated in the "opening" direction, is initiated when the condition characteristics ZKS and ZKO are respectively "driven over".

These transient clutch conditions 11 to 14, however, can also be initiated by the electronic control unit 43 when the driving condition alternates between "driving operation" and ~overrun operation". It is possible for the overrun operation to be recognized by the control unit 43 because the accelerator pedal 26 has not been actuated and the rotational speed of the internal combustion engine 8 is higher than the idling rotational speed or because the engine torque, and therefore the received signal 46, is negative.

When the transmission ratio of the change-speed gearbox 9 changes, the transient clutch conditions 11 to 14 can likewise be initiated by the control unit 43.

The method and arrangement according to the present invention for controlling the control pressure p42 in the control pressure conduit 42 by the control unit 43 in accordance with FIG. 2 and FIG. 4 to 6, relates exclusively to, in each case, one of the transient clutch conditions 11 to 14 and exclusively to such a phase of this condition as has been initiated by a time change of the accelerator pedal position or by a time change of the clutch temperature or by both of these conditions and is to be characterized by a variation of the control pressure p42 determined by a time function. For this purpose, the electronic control unit 43 provides a time-controlled pressure specification for the magnetic valve 41 in the form of an electrical current signal in the line 44. The time function is specified in the control unit 43 as, for example, the first time derivative of the pressure, the so-called gradient, as a function of the accelerator pedal actuation and the clutch temperature.

Figure 4:
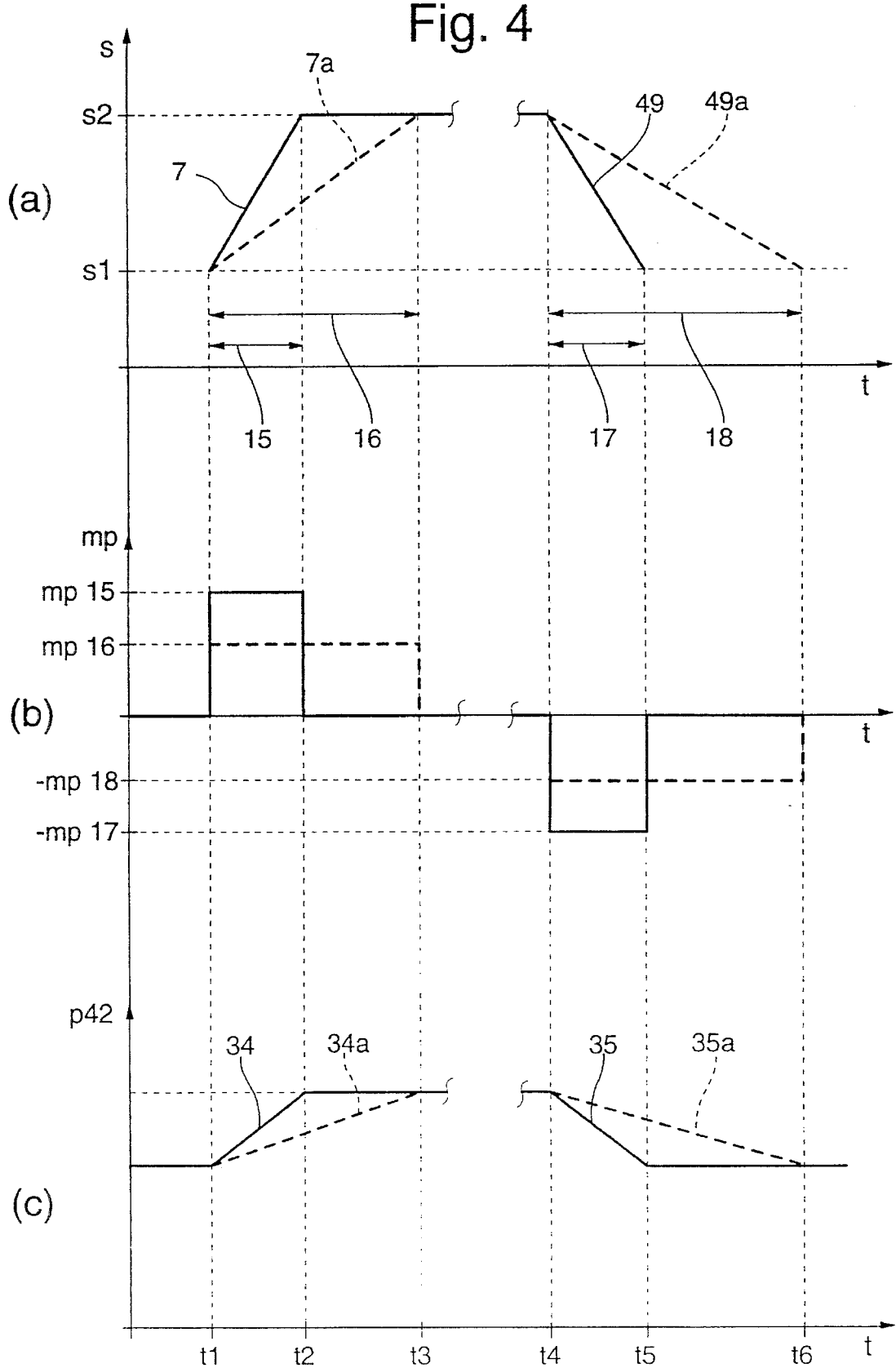
FIG. 4 constitute three time diagrams (a)–(c) showing the dependence of the working pressure of the clutch actuating element of the clutch of FIG. 1 and the pressure gradient on the time change of the position of the accelerator pedal of the motor vehicle.
Figure 5:
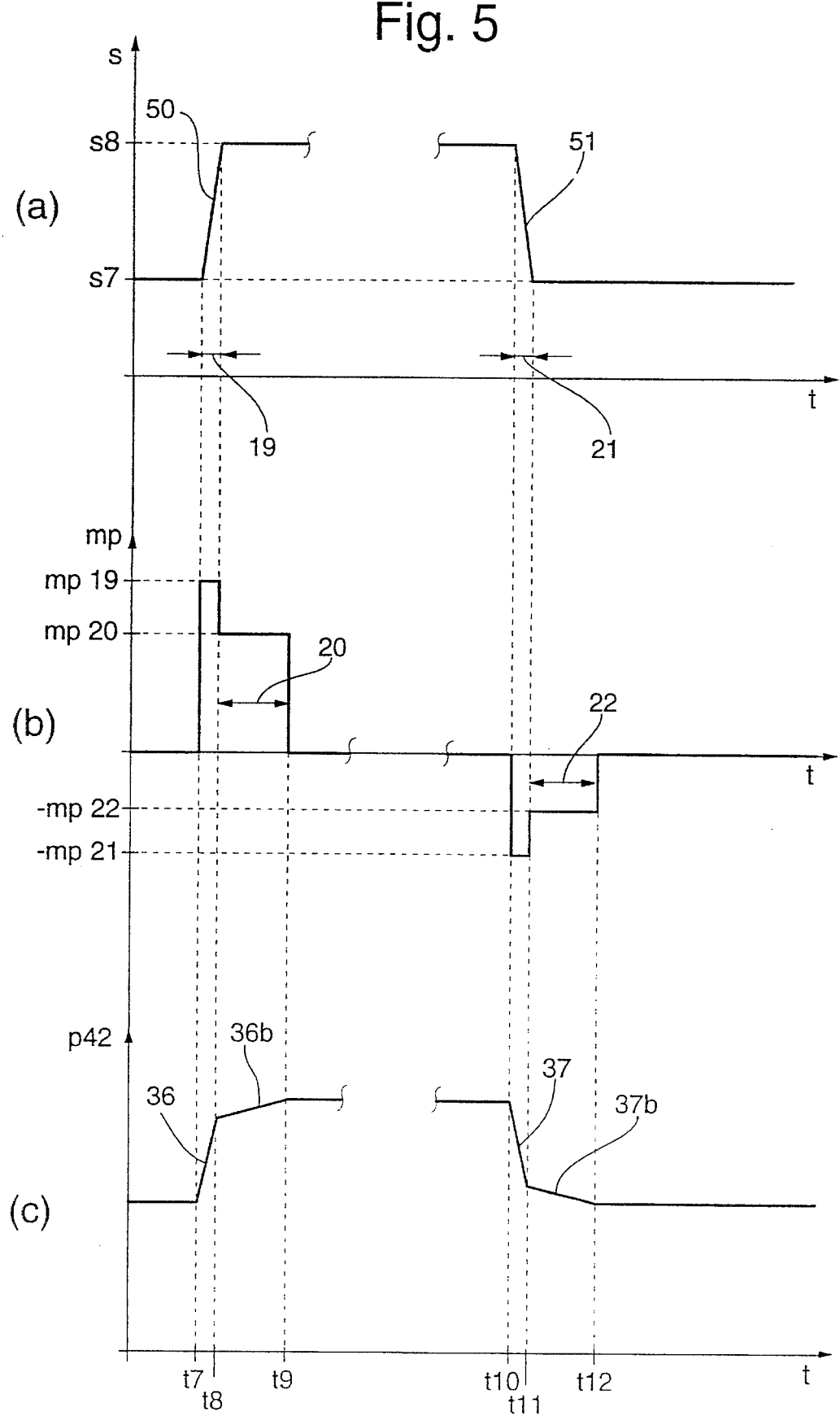
FIG. 5 constitutes three time diagrams (a)–(c) representing a follow-up phase which can be selected in the method according to the present invention.
Figure 6:
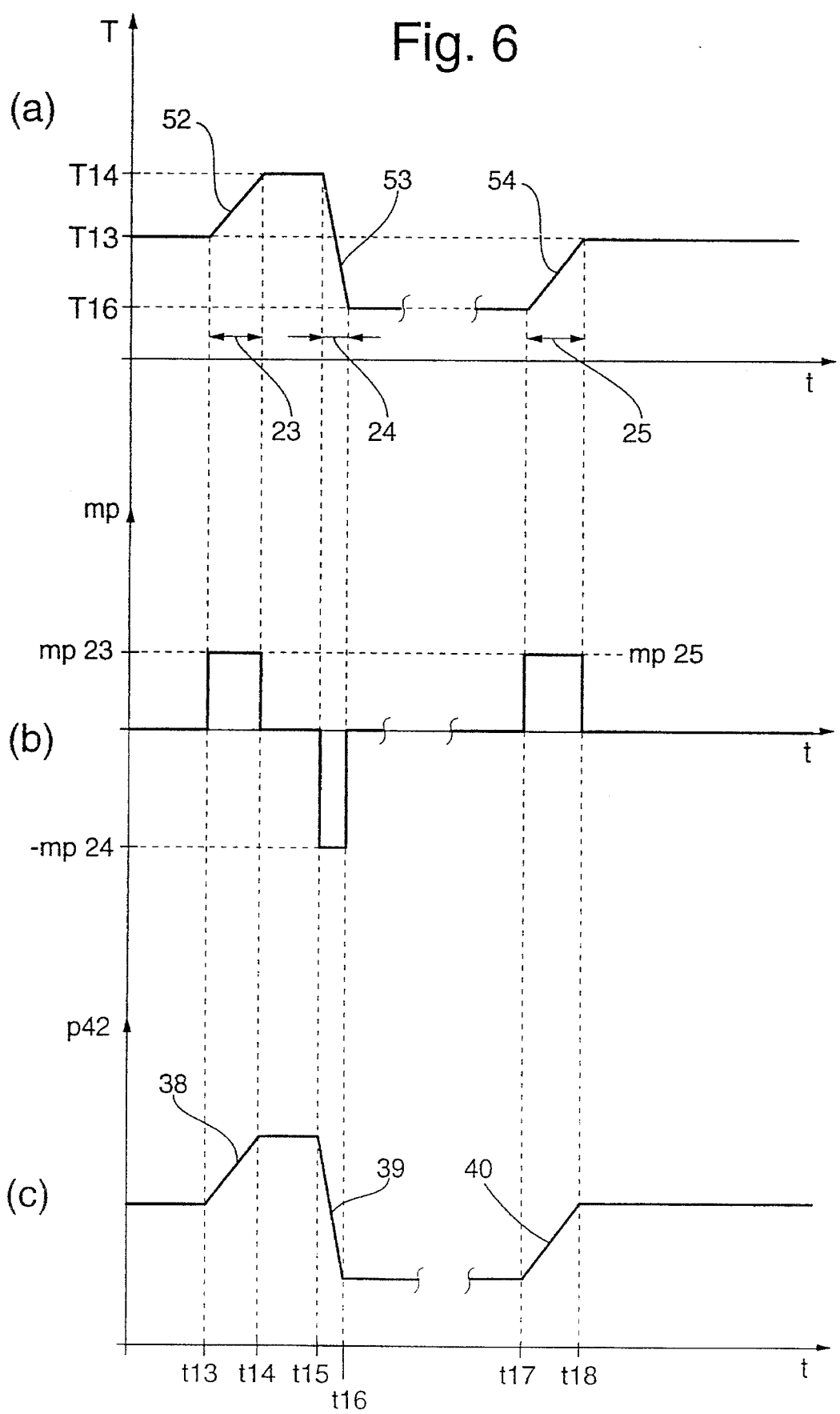
FIG. 6 constitutes three time diagrams (a)–(c) showing the dependence of the working pressure of the clutch actuating element of the clutch of FIG. 1 and the pressure gradient on the time change of the clutch temperature.

The gradient dependency is represented in FIGS. 4 to 6. Referring specifically to FIG. 4, the accelerator pedal displacement s is plotted against the time t in diagram (a), the gradient mp is plotted against the time t diagram (b) and the pilot pressure p42 of the control pressure conduit 42 is plotted against the time t in diagram (c).

It is assumed that a transient clutch condition (e.g., the clutch condition 11 in FIG. 3) is initiated and a medium accelerator pedal speed (s2–s1):(t2–t1) is then recorded in accordance with the curve 7 in diagram (a) of FIG. 4. This accelerator pedal speed 7 is, as is shown in diagram (b) of FIG. 4, associated with a medium value mp 15 of the gradient so that the control unit 43 provides a gradient phase 15=t1–t2 with a rise 34 of medium steepness in the control pressure p42, as shown in diagram (c).

If, however, the accelerator pedal speed (s2–s1):(t3–t2) recorded in the transient clutch condition 11 of FIG. 3 is lower, as shown in the curve 7a of diagram (a) of FIG. 4, the electronic control unit 43 provides a gradient phase 16 with a flatter rise 34a as seen in diagram (c) of the control pressure p42 because the lower accelerator pedal speed 7a of diagram (b) is associated with a correspondingly lower value mp 16 of the gradient.

Whereas in the two previously described transient clutch conditions, the accelerator pedal was respectively depressed in the sense of an increase in power, a transient clutch condition (e.g., the clutch condition 14 in FIG. 3) is now assumed in which the accelerator pedal is withdrawn in the direction of its rest position and, as shown in diagram (a) of FIG. 4, a medium accelerator pedal speed (s1–s2):(t5–t4) is then recorded as shown by the curve 49. This medium accelerator pedal speed 49 is associated with a medium negative value, mp17, of the gradient mp, as shown in diagram (b), so that the electronic control unit 43 provides a gradient phase 17=t4–t5 with a falling curve 35 of medium steepness in the control pressure p42.

If, however, the accelerator pedal speed (s1–s2):(t6–t5) recorded in the transient clutch condition 14 is lower, corresponding to the curve 49a in diagram (a) of FIG. 4, the electronic control unit 43 provides a gradient phase 18=t5–t6 with a curve 35a which falls less steeply, as shown in diagram (c) of FIG. 4, because the lower accelerator pedal speed is associated with a lower negative gradient value, mp18, as shown in diagram (b).

If during an unstable clutch condition (e.g. during the clutch condition 12 of FIG. 3) a high accelerator pedal speed (s8–s7):(t8–t7) is recorded as shown in the curve 50 of diagram (a) of FIG. 5 and which is associated with a high value mp19 of the gradient mp as shown in diagram (b) of FIG. 5, the electronic control unit 43 provides both a gradient phase 19=t7–t8 with a correspondingly steep rise 36 of the control pressure p42, as shown in diagram (c), and an adjoining follow-up phase 20 with a flatter rise 36b of the control pressure p42. The follow-up phase 20=t8–t9 extends beyond the instant t8 at which the accelerator pedal displacement change δs has become zero. The value mp20 of the gradient of the follow-up phase 20 then depends on the value mp19 of the gradient phase 19.

A corresponding dependency of the gradient on the accelerator pedal displacement change is also specified for high negative accelerator pedal speeds. A transient clutch condition (e.g., the transient clutch condition 13 of FIG. 3) is therefore assumed in which a negative accelerator pedal speed (s7–s8):(t11–t10) is recorded, as shown in the curve 51 of diagram (a) of FIG. 5. This high negative accelerator pedal speed is associated with a high negative value, mp21, of the pressure gradient shown in diagram (b), so that the electronic control unit 43 provides a gradient phase 21–t10–t11 with a correspondingly steeply falling curve 37 of the control pressure p42 and an adjoining follow-up phase 22=t11–t12 with a less steeply falling curve 37b of the control pressure p42, as shown in diagram (c) of FIG. 5. The follow-up phase 22 begins at the instant t11, at which the accelerator pedal change of diagram (a) has become zero. The somewhat lower value, mp22, of the gradient of the follow-up phase 22 is again determined by the high value, mp21, of the preceding gradient phase 21.

If, during a transient clutch condition, the temperature T of the clutch 10 changes rapidly, rising for example at a rate (T14−T13):(t14−t13), as shown in the curve 52 of diagram (a) of FIG. 6, the electronic control unit 43 then provides a gradient phase 23=t13−t14 with a steep rise 38 of the control pressure p42, as shown in diagram (c) of FIG. 6, because a high value, mp23, of the pressure gradient, mp, is associated with the high rate of change 52.

If, during a transient clutch condition, the temperature T of the clutch 10 falls rapidly, falling for example at a rate (T16−T13):(t16−t15) as shown by the curve 53 of diagram (a), the electronic control unit 43 then provides a gradient phase 24=t15−t16 with a steep fall 39 of the control pressure p42, as shown in diagram (c), because a high negative pressure gradient value, mp24, as shown in diagram (b), is associated with the high negative rate of change 53.

If, during a transient clutch condition, the temperature T of the clutch 10 increases in a different temperature range T13−T16 at the same rate as in the temperature range T13−T14, as is indicated in diagram (a) of FIG. 6 by the curve 54 between the instants t17 and t18 and by the curve 52 between the instants t13 and t14, the electronic control unit 43 then provides a gradient phase 25=t17−t18 in which the pressure rise 40 of the control pressure p42 is equal to the pressure rise 38 in the comparable gradient phase 23 because the same gradient value mp23=mp25 is specified for the same rates 52=54, as shown in diagram (b).

Figure 2:
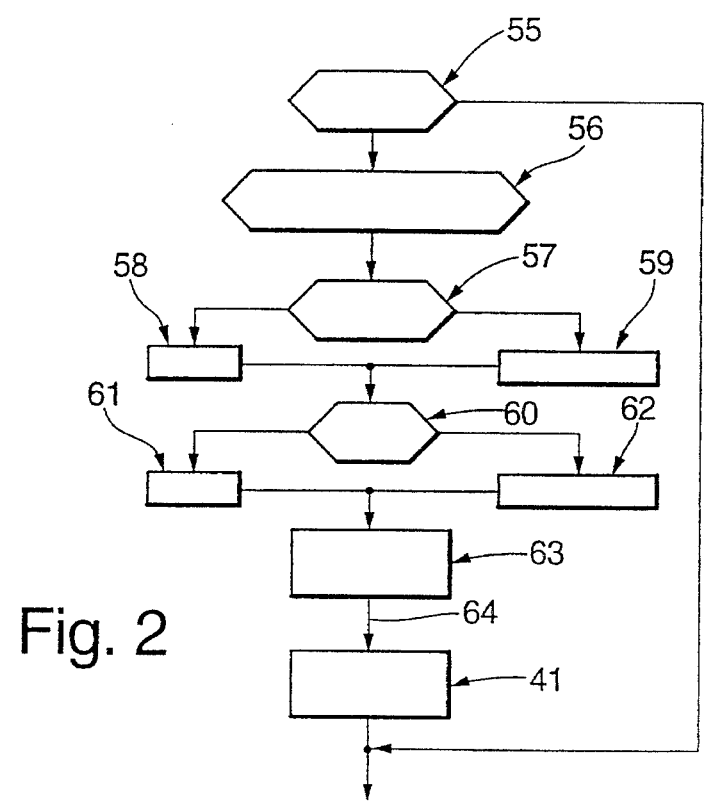
FIG. 2 is a signal flow diagram provided for carrying out the method according to the present invention in the clutch of FIG. 1.

Referring to FIG. 2, the electronic control unit 43 operates in such a way that a first evaluation step 55 determines whether a transient clutch condition is present. If this is the case, a "gradient control" sub-program 56 is initiated in which an evaluation step 57 checks whether the accelerator pedal is being actuated rapidly. If this is not the case, a proportionality factor mp_1 of the pressure gradient, which depends on the accelerator pedal, is determined in a computational operation 58 as being 1.0. If, however, a rapid change in the accelerator pedal is recorded, the proportionality factor mp_1, which depends on the accelerator pedal, is determined in a computational operation 59 as a function of the accelerator pedal speed: mp_1=f($\delta s/\delta t$).

The sub-program 56 includes a further evaluation step 60 which checks whether a change in temperature occurs at the clutch in the existing transient clutch condition. If this is not the case, a computational operation 61 determines a proportionality factor mp_2 of the pressure gradient, which depends on the temperature, as being 1.0. If, however, a change in temperature is recognized, the proportionality factor mp_2, which depends on temperature, is determined in a computational operation 62 as a function of the rate of change of the temperature T:mp_2=f($\delta T/\delta t$). The current pressure gradient, mp, is calculated from the proportionality factors, mp_1 and mp_2, in a subsequent computational step 63: mp=(mp_1)×(mp_2).

The electromagnetic pilot valve 41 is finally subjected to a signal 64 corresponding to the current pressure gradient mp at the output 44 of the control unit 43, and the pilot valve 41 provides the control pressure p42=(mp)×($\delta t$)+p0.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. An arrangement for controlling a regulating variable which determines a rotational speed difference of a clutch located in a force path between an internal combustion engine and a change-speed gearbox of a motor vehicle, comprising (a) an electronic control unit configured and arranged to process input signals dependent on influencing variables specific to the motor vehicle and fixed required value characteristics and to provide output signals representative of required values for actuating an element adjusting the regulating variable;

(b) a device configured to record an influencing variable dependent on a speed of an accelerator pedal and operatively associated with the electronic unit;

(c) a device configured to record an influencing variable dependent on a clutch temperature and operatively associated with the electronic unit, wherein, during a transient clutch condition a phase with a variation, determined by a specified time function, of the regulating variable is selectable and a beginning and an end of both the transient clutch condition and the phase being respectively fixed as a function of the influencing variables specific to the vehicle, and (d) a device configured to record an influencing variable dependent on rate of change of the clutch temperature, wherein at least one of the influencing variables, one of which depends on the rate of change of the clutch temperature and the other of which depends on the speed of the accelerator pedal, is utilizable exclusively to fix the beginning and the end of the phase and to fix a curve, determined by a specified time function, of the regulating variable.

2. The arrangement according to claim 1, wherein the end of a phase with a curve determined by a specified time function is fixed by an instant at which the accelerator pedal speed reaches a lower scalar limiting value, and a follow-up phase with a curve, determined by a specified time function, of the regulating variable can be selected at the instant if the accelerator pedal speed in the phase located before this instant is determined to have exceeded a predetermined upper scalar limiting value.

3. The arrangement according to claim 2, wherein a curve, determined by a specified time function, in a follow-up phase depends on the accelerator pedal speed.

4. The arrangement according to claim 1, wherein the influencing variables fixing the transient clutch conditions include load change between a driving operation and an overrun operation.

5. The arrangement according to claim 4, wherein the end of a phase with a curve determined by a specified time function is fixed by an instant at which the accelerator pedal speed reaches a lower scalar limiting value, and a follow-up phase with a curve, determined by a specified time function, of the regulating variable can be selected at the instant if the accelerator pedal speed in the phase located before this instant is determined to have exceeded a predetermined upper scalar limiting value.

6. The arrangement according to claim 5, wherein a curve, determined by a specified time function, in a follow-up phase depends on the accelerator pedal speed.

7. The arrangement according to claim 1, wherein the influencing variables fixing the transient clutch conditions include a characteristic diagram dependent on engine operating parameters for the change in the clutch conditions.

8. The arrangement according to claim 7, wherein the end of a phase with a curve determined by a specified time function is fixed by an instant at which the accelerator pedal speed reaches a lower scalar limiting value, and a follow-up phase with a curve, determined by a specified time function, of the regulating variable can be selected at the instant if the accelerator pedal speed in the phase located before this instant is determined to have exceeded a predetermined upper scalar limiting value.

9. The arrangement according to claim 8, wherein a curve, determined by a specified time function, in a follow-up phase depends on the accelerator pedal speed.

10. The arrangement according to claim 9, wherein the influencing variables fixing the transient clutch conditions include load change between a driving operation and an overrun operation.

11. The arrangement according to claim 1, wherein the influencing variables fixing the transient clutch conditions include changes in the transmission ratio of the change-speed gearbox.

12. The arrangement according to claim 11, wherein the end of a phase with a curve determined by a specified time function is fixed by an instant at which the accelerator pedal speed reaches a lower scalar limiting value, and a follow-up phase with a curve, determined by a specified time function, of the regulating variable can be selected at the instant if the accelerator pedal speed in the phase located before this instant is determined to have exceeded a predetermined upper scalar limiting value.

13. The arrangement according to claim 12, wherein a curve, determined by a specified time function, in a follow-up phase depends on the accelerator pedal speed.

14. The arrangement according to claim 13, wherein the influencing variables fixing the transient clutch conditions include load change between a driving operation and an overrun operation.

15. The arrangement according to claim 1, wherein the influencing variables fixing the transient clutch conditions include a characteristic diagram dependent on engine operating parameters for the change in the clutch conditions.

16. A method for controlling a regulating variable which determines a rotational speed difference of a clutch located in a force path between an internal combustion engine and a change-speed gearbox of a motor vehicle, comprising the steps of (a) processing input signals dependent on influencing variables specific to the motor vehicle and fixed required value characteristics and providing output signals representative of required values for actuating an element adjusting the regulating variable;

(b) recording an influencing variable dependent on a speed of an accelerator pedal and operatively associated with the electronic unit;

(c) recording an influencing variable dependent on a clutch temperature and operatively associated with the electronic unit, wherein, during a transient clutch condition a phase with a variation, determined by a specified time function, of the regulating variable is selectable and a beginning and an end of both the transient clutch condition and the phase being respectively fixed as a function of the influencing variables specific to the vehicle;

(d) recording an influencing variable dependent on rate of change of the clutch temperature; and (e) using at least one of the influencing variables, one of which depends on the rate of change of the clutch temperature and the other of which depends on the speed of the accelerator pedal, exclusively to fix the beginning and the end of the phase and to fix a curve, determined by a specified time function, of the regulating variable.

* * * * *